US008236400B2

(12) United States Patent
Trigg et al.

(10) Patent No.: US 8,236,400 B2
(45) Date of Patent: Aug. 7, 2012

(54) ADHESIVE COVER SYSTEMS FOR ARTICLES

(75) Inventors: Larry E. Trigg, Santa Clara, CA (US); Sam Lucente, San Francisco, CA (US); Allison Johnson, Menlo Park, CA (US); Mohammad M Samii, La Jolla, CA (US); Paul E Bradley, Redwood City, CA (US); Arvind Kumar Gupta, Van Nuys, CA (US); Kara Whitney Johnson, San Francisco, CA (US); Matthias Wieser, San Francisco, CA (US); Matthew Robert Adams, Mountain View, CA (US); James J Genis, Escondido, CA (US); L William Smith, Placentia, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 836 days.

(21) Appl. No.: 10/943,683

(22) Filed: Sep. 17, 2004

(65) Prior Publication Data

US 2006/0062953 A1 Mar. 23, 2006

(51) Int. Cl.
*B32B 9/00* (2006.01)
*G09F 3/10* (2006.01)

(52) U.S. Cl. ..................... 428/40.1; 428/42.2; 428/42.3; 428/43; 40/299.01; 40/336

(58) Field of Classification Search ................. 428/40.1, 428/40.2, 41.7, 41.9, 42.1, 42.2, 42.3, 43; 283/71, 81, 101, 106; 399/389; 40/299.01, 40/306, 336, 643
See application file for complete search history.

(56) References Cited

U.S. PATENT DOCUMENTS

| | | | | |
|---|---|---|---|---|
| 2,954,635 | A * | 10/1960 | Stotter | 108/90 |
| 3,687,769 | A | 8/1972 | Dague | |
| 3,886,020 | A | 5/1975 | Shank et al. | |
| 4,385,460 | A | 5/1983 | Hanna | |
| 4,687,536 | A | 8/1987 | Hiramatsu et al. | |
| 4,903,255 | A | 2/1990 | Sugaya et al. | |
| 5,421,950 | A | 6/1995 | Parrish | |
| 5,543,001 | A | 8/1996 | Casillo et al. | |
| 5,731,058 | A | 3/1998 | Juso et al. | |
| 5,749,994 | A | 5/1998 | Sundet et al. | |
| 5,783,033 | A | 7/1998 | Grossman | |
| 5,902,446 | A | 5/1999 | Casillo et al. | |

(Continued)

FOREIGN PATENT DOCUMENTS

CN 2601407 1/2004

(Continued)

OTHER PUBLICATIONS

Pow erDesign USA Website (www.powerdesignusa.com/products/ipod/real.php), pp. 1-3, Copyright 2001-2004.

(Continued)

*Primary Examiner* — Patricia Nordmeyer

(57) ABSTRACT

A protective device for attaching to and protecting at least one article includes a cover having an attachment surface and a display surface opposing the attachment surface. An adhesive coating is applied to the attachment surface of the cover to facilitate adhesion of the cover to an article. A removable backing is releasably attached to the adhesive coating and at least one relief notch is formed in the cover through the attachment surface of the cover and terminates beneath the display surface of the cover.

25 Claims, 4 Drawing Sheets

U.S. PATENT DOCUMENTS

| | | | | |
|---|---|---|---|---|
| 6,017,079 | A * | 1/2000 | Warner | 296/136.07 |
| 6,196,290 | B1 | 3/2001 | Tracy et al. | |
| 6,321,814 | B1 | 11/2001 | Tracy et al. | |
| 6,479,118 | B1 * | 11/2002 | Atkinson | 428/40.1 |
| 2002/0155245 | A1 * | 10/2002 | Davis et al. | 428/43 |

FOREIGN PATENT DOCUMENTS

| | | | |
|---|---|---|---|
| EP | 0 328 925 | A | 8/1989 |
| EP | 1 046 518 | A | 10/2000 |
| EP | 1046518 | | 10/2000 |
| EP | 1 055 525 | A | 11/2000 |
| EP | 1 085 489 | A | 3/2001 |
| GB | 1 292 962 | A | 10/1972 |
| JP | 7077939 | | 3/1995 |
| JP | 7084525 | | 3/1995 |
| JP | 9300815 | | 11/1997 |
| JP | 10244770 | | 9/1998 |
| JP | 2000 227760 | A | 1/2001 |
| JP | 2001236020 | | 8/2001 |
| JP | 2001335014 | | 12/2001 |
| WO | WO 00/29224 | * | 5/2000 |

OTHER PUBLICATIONS

PowerDesign USA Website (www.powerdesignusa.com/products/ipod/selfdesign.php), pp. 1-2, Copyright 2001-2004.

PowerDesign USA Website (www.powerdesignusa.com/products/ipod/bodymask.php), pp. 1-2, Copyright 2001-2004.

Translation of CN112005002162.9 OA corresponding to U.S. Appl. No. 10/943,683.

Translation of DE11 2005 002 OA corresponding to U.S. Appl. No. 10/943,683.

Translation of Japanese Office Action dated Mar. 29, 2011 for Japanese application No. 2007-532437, Adhesive Cover Systems for Articles, Hewlett-Packard Development Company L.P. (Applicant).

* cited by examiner

ADHESIVE COVER SYSTEMS FOR ARTICLES

FIELD OF THE INVENTION

The present invention relates generally to adhesive cover systems for protecting and/or decorating articles.

BACKGROUND OF THE INVENTION

Many consumers desire to apply covers to articles in order to protect the article and/or to provide an enhanced, decorative appearance to the article. For example, covers have been developed that allow a consumer to apply a customized, decorative appearance to a hand-held electronic device while also protecting the device from becoming scratched or damaged. Such covers have been provided as die-cut, blank adhesive labels that can be fed through a printer to receive a printed image. After printing an image to the label, the consumer generally removes a backing from an adhesive layer of the label and attaches the adhesive, and thus the label, to the article in question. In other cases, pre-printed adhesive covers are provided to consumers who can attach the cover to an article of choice to decorate and protect the article.

It has been found that one desirable aspect of such covers is the ability for a consumer to customize an article according to his or her desires. It is therefore often the case that such a cover or label is provided as a removable cover, to allow the consumer to apply, and subsequently remove the cover or label at will. In this manner, the consumer can replace the cover with an alternate cover, or can return the article to its original condition. To address this need, manufacturers generally utilize a removable adhesive with the cover or label so that the cover will remain affixed to the article while in use but can also be relatively easily removed by the consumer when the consumer so desires.

Such adhesives have been found to perform well when used to attach a label to an article with a relatively flat, uniform surface; such as the face of a hand-held musical player, PDA or a cell phone. Problems have arisen, however, when attempting to protect or partially cover an article with a label that is intended to be extended around, or wrapped about, sides of the article.

SUMMARY OF THE INVENTION

It has been recognized that it would be advantageous to develop a cover system that allows a consumer to removably attach a cover or a label to an article and securely adhere edges of the cover around and near edges of the article without edges of the cover premature lifting or peeling from the article.

The present invention provides a protective device for attaching to and protecting at least one article, including a cover having an attachment surface and a display surface opposing the attachment surface. An adhesive coating can be applied to the attachment surface of the cover to facilitate adhesion of the cover to an article. A removable backing can be releasably attached to the adhesive coating and at least one relief notch can be formed in the cover through the attachment surface of the cover and can terminate beneath the display surface of the cover.

In accordance with another aspect of the present invention, a protective device for attaching to and protecting at least one article is provided, including a cover having an attachment surface and a display surface opposing the attachment surface. An adhesive coating can be applied to the attachment surface of the cover to facilitate adhesion of the cover to the article. The adhesive coating can include at least a first section of adhesive having a first adhesive strength and a second section of adhesive having a second adhesive strength. The first adhesive strength can differ from the second adhesive strength. A removable backing can be releasably attached to the adhesive coating.

In accordance with another aspect of the present invention, a method for preparing a protective device for covering and protecting an article is provided, including the steps of: forming at least one relief notch in a cover, the relief notch extending through an attachment surface of the cover and terminating beneath a display surface of the cover; applying an adhesive coating to the attachment surface of the cover to enable adhesion of the cover to an article; and releasably applying a removable backing to the adhesive coating to shield the adhesive coating until the cover is to be attached to the article.

In accordance with another aspect of the present invention, a method for preparing a protective device for covering and protecting at least one article is provided, including the steps of: applying an adhesive coating to an attachment surface of a cover to enable adhesion of the cover to an article; the adhesive coating including at least a first section of adhesive having a first degree of adhesive strength and a second section of adhesive having a second degree of adhesive strength; the first adhesive strength differing from the second adhesive strength; and releasably applying a removable backing to the adhesive coating to shield the adhesive coating until the cover is to be attached to the article.

Additional features and advantages of the invention will be apparent from the detailed description which follows, taken in conjunction with the accompanying drawings, which together illustrate, by way of example, features of the invention.

DETAILED DESCRIPTION OF THE PREFERRED EMBODIMENT(S)

Figure 1:
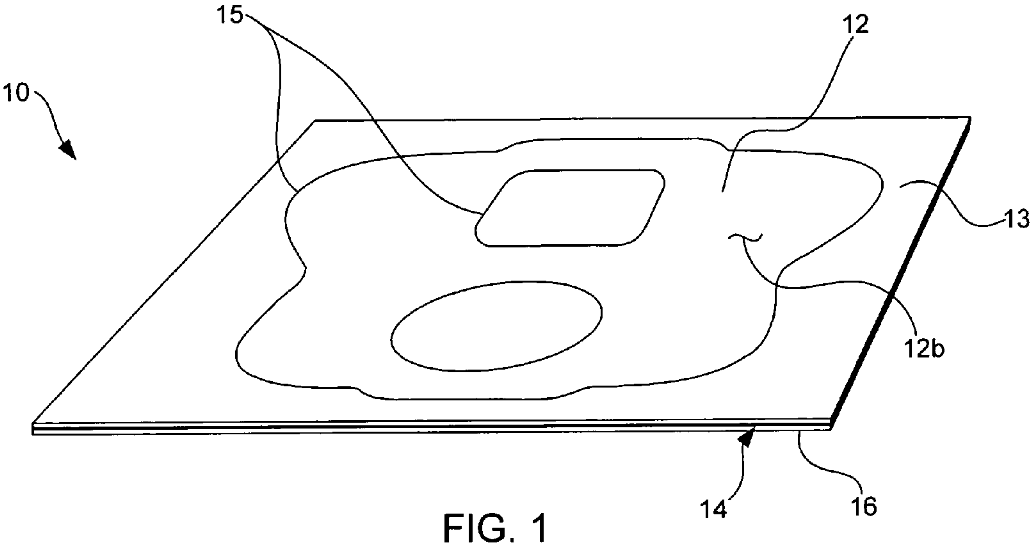
FIG. 1 is a perspective view of a protective device in accordance with an embodiment of the present invention.

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used:

The singular forms “a,” “an,” and “the” include plural referents unless the context clearly dictates otherwise.

As used herein, the term “image” is to be understood to refer to a marking that can include a variety of printed material including textual material, pictorial material, iconographical material, etc., and various combinations thereof. An image can be applied using any of a number of known printing methods, without limitation. In one embodiment, the printed image can be applied using a consumer printing device, such as a laser printer or an ink-jet printer. In another embodiment, the image can be a professionally applied, pre-printed image.

As used herein, the terms “removable,” or “removably attached,” are to be understood to refer to an attached relationship between two materials in which the materials remain attached under a first set of conditions but can be unattached from each other without causing significant structural damage to either of the materials and without transferring significant residue from one of the materials to the other.

As used herein, the term “adhesive strength” is typically used in the context of providing a relative comparison of two or more adhesives, and their binding strength to a particular substrate. For example, a first adhesive with a first, stronger binding strength will form a more durable bond with a substrate than a second adhesive with a second, weaker binding strength.

As used herein, the term “adhesive modifier” is to be understood to refer to a substance that, when added or applied to an adhesive, modifies or alters the binding strength of the adhesive. One example of a known adhesive modifier is sold by Alden & Ott Flexo Inks, L.P. of Arlington Heights, Ill. under the name Multi-Grip SP Adhesive Deadener. In this example, the adhesive modifier comprises an adhesive dampener or deadener. Adhesive modifiers used herein are classed into at least two types: adhesive strength enhancers, which increase the binding strength of an adhesive; and adhesive strength dampeners, which decrease the binding strength of an adhesive.

The term “protective” when referring to the device or cover of the present invention refers to at least some degree of protection to a device, no matter how slight compared to a device without the cover in place on the device. Optionally, the device can be decorative or decoratable, and thus, the device or cover is often referred to as a protective and/or decorative device.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
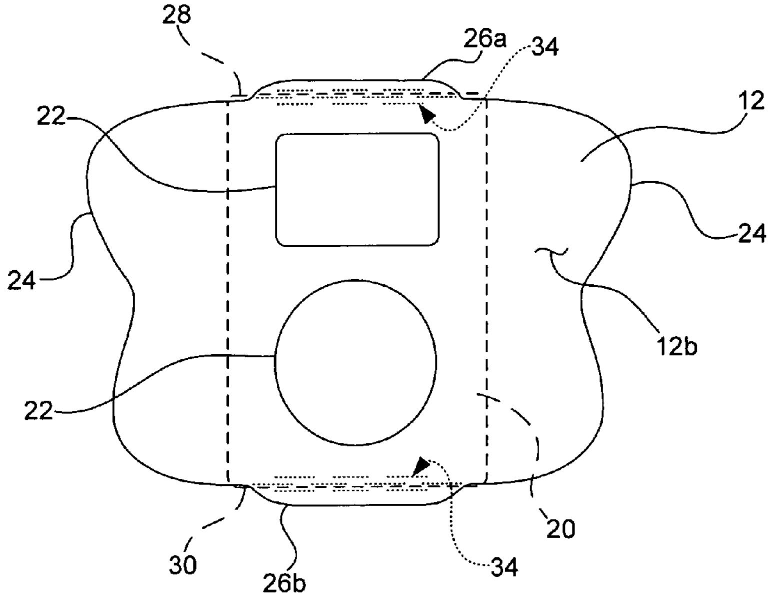
FIG. 2 is a top view of a cover or label of the protective device of FIG. 1 disposed over an exemplary article shown in schematic view.
Figure 5A:
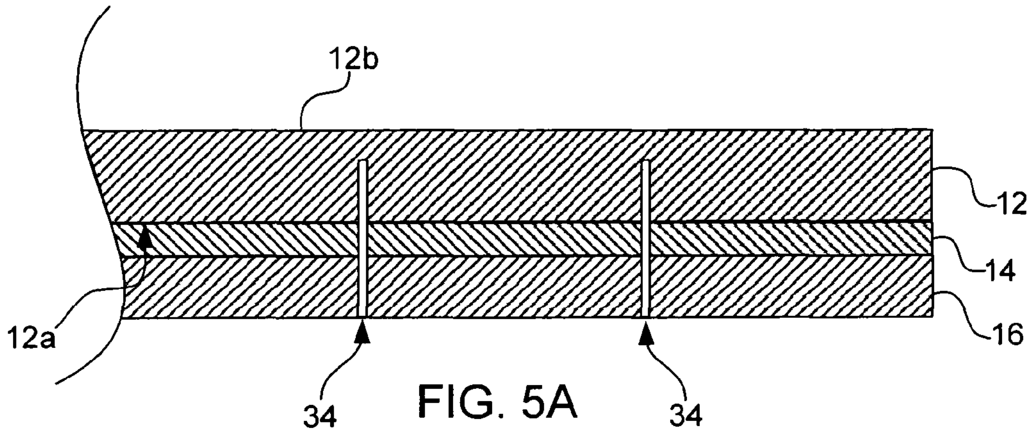
FIG. 5A is a sectional edge view of the cover or label of FIG. 4 taken along section 5-5 of FIG. 4.

As illustrated in FIGS. 1 and 5A, a protective and/or decorative device 10 in accordance with the present invention is shown that provides a cover or label 12 for attaching to and protecting or decorating an article (shown schematically at 20 in FIG. 2). The cover can include an attachment surface 12*a* (shown in FIG. 5A) and a display surface 12*b* opposing the attachment surface. An adhesive coating 14 can be applied to the attachment surface of the cover to facilitate adhesion of the cover to the article. A removable backing 16 can be releasably attached to the adhesive coating. In use, a consumer can detach the removable backing from the adhesive coating to expose the adhesive. The adhesive coating can then be applied to the article to secure the label on or over the article in order to protect and/or decorate the article.

The assembly or device 10 shown in FIG. 1 is one exemplary manner in which the cover or label 12 can be provided to consumers. In this embodiment, a sheet 13 of cover or label material is provided with adhesive coating 14 applied across substantially the full sheet. Removable backing 16 can be applied to the adhesive coating across substantially the entire coating. Cover or label 12 can be severed from the remainder of sheet 13 by methods known to those in the art, such as by die-cutting, etc, as illustrated generally at 15. Thus, when a consumer desires to remove the cover or label from the device 10, the cover can be separated from the sheet and peeled from the removable backing. Once separated from the sheet and removed from the backing, the cover or label can be applied to the article (20 in FIG. 2).

FIG. 2 illustrates the cover or label 12 placed into position over article 20 (shown schematically for exemplary purposes only). In the embodiment shown, the removable backing (16 of FIG. 1) has been removed from the label. As shown, the label can include one or more apertures 22 which can be configured to expose operable features of the article through the cover or label. Once the cover is properly aligned over the article, the portion of the cover corresponding to the face of the article can be attached to the face of the article. Generally, once the cover is adhered to the face of the article, sides 24 of the label are wrapped around sides and a bottom of the article. Tabs 26*a*, 26*b* of the cover or label can then be wrapped around upper 28 and lower 30 edges or corners of the article and can terminate on upper and lower sides of the article, respectively.

It is to be understood that the article 20 shown in FIG. 2 is for exemplary purposes only and that covers or labels 12 in accordance with the present invention can be used on a variety of articles that can benefit from application of a cover. Suitable articles include hand-held electronic articles such as portable music players, cell phones, personal digital assistants (“PDAs”), cameras, video recorders, and the like.

While covers or labels 12 in accordance with the present invention can be used in a variety of applications, in one aspect of the invention the cover or label is removable. In this manner, the cover or label is adhered to the article 20 with sufficient strength so as to remain in place during ordinary usage, but can also be removed by the consumer with relative ease. Thus, the adhesive coating 14 is generally selected from known “removable” or “releasable” adhesives that form temporary bonds between the cover or label and the article. Examples of suitable releasable adhesive materials for use in the present invention include, without limitation, a variety of adhesives that have a low cohesive strength with articles, bond well to paper or plastic sheets, and are relatively “non-tacky” to the touch when dry. The removable adhesive may be applied to the attachment surface (12*a* in FIG. 5A) of the sheet (13 in FIG. 1) in a fluid state and then converted to a solid by heat, cooling, radiation, or a chemical reaction. Suitable classes of releasable adhesives include water based, hot melt, solvent based, acrylic, and so-called “100% solids” adhesives. Water-based polymer latexes or hot melts such as waxes or polymeric resins are also suitable adhesives.

Such removable adhesives have performed well in adhering covers or labels 12 to generally flat faces of articles 20. However, it has been found that the tabs 26*a*, 26*b*, which are wrapped about the upper 28 and lower 30 edge or corner of the article, respectively, can be prone to prematurely lifting from upper and lower sides of the article due to cantilever forces introduced in the tabs upon bending or wrapping the tabs about the article. These bending forces are thought to be due to even small degrees of stiffness inherent in the material of the cover or label which tend to maintain the cover or label in its original, flat configuration. Thus, as the label is bent and attached to sides of the article, the label material is stressed into a flexed condition that tends to resist the adhesive force holding the tabs against the sides of the article. The stresses imposed in the material adjacent the attached tabs can result in the tabs peeling or lifting away from the sides of the article despite the adhesive present on the tabs.

The present invention addresses these shortcomings in a number of manners. In the embodiment illustrated in FIGS. 2 through 5A, the protective and/or decorative cover or label 12 can include at least one relief notch 34 formed in the cover. The relief notch can extend through the cover to a varying degree, depending upon uses of the cover or label, or upon capabilities of the processes used to form the relief notch. In the embodiment illustrated in FIG. 5A, the relief notch extends through the attachment surface 12*a* of the cover and terminates beneath the display surface 12*b* of the cover.

While the present invention is not so limited, the embodiments shown in the figures generally include a series of relief notches 34 formed adjacent to edges of the cover or label 12, which in this case are adjacent to the tabs 26*a*, 26*b*. In this manner, the relief notches are formed in sections of the cover or label which are subjected to bending as the cover or label is wrapped or extended around corners or edges 28, 30 of the article 20. In this manner, the relief notches serve as stress and/or strain relief discontinuities which resist the formation of cantilever forces in the cover or label 12. As the relief notch minimizes or limits formation of cantilever forces near the tabs, the portions of the adhesive coating 14 on the tabs have been found to be adequate to maintain adherence of the tabs to the upper and lower sides of the article. In addition to forming the relief notches adjacent the tabs, the relief notches can also be formed in other areas of the cover or label that extend around a corner or edge, particularly where cantilever forces may be more pronounced.

In the case where the cover or label 12 is formed of a fibrous material, such as printable paper, the at least one relief notch 34 can be formed in the cover and can at least partially sever one or more fibers (not shown) of the cover. In this manner, the cantilever forces otherwise formed in the fibrous cover when folding or bending the cover around corners are limited, as the fibers which may otherwise carry tensile loads are severed.

The at least one relief notch 34 can be formed in the cover or label 12 in a number of configurations and in a number of patterns. The embodiment illustrated in FIGS. 2-4 (and in sectional view in FIGS. 5A-5B) includes a series of notches formed in two or more rows (in this case, three rows). Shown in more detail in bottom view in FIG. 4, where unlike the embodiment shown in FIG. 3, the removable backing 16 is sized and shaped to substantially match the size and shape of the cover, two of the notches 34*a*, 34*b* can form a pair of individual, collinear relief notches. A second set of notches, 34*c*, 34*d*, can form a second pair of individual, collinear relief notches oriented parallel to the first pair of individual, collinear relief notches. While generally elongate notches are shown in the figures, it is to be understood that the notches can be formed in a variety of shapes and patterns, such as the elongate "dashes" shown. In addition, it is contemplated that distinct holes or "dots" can also be used a relief notches, with a variety of combinations of either or both "dashes" and "dots" also being contemplated.

Returning to FIG. 5A, the relief notch 34 can extend through the adhesive coating 14 and through the attachment surface 12*a* of the cover 12. The relief notch can also extend through the removable backing 16, through the adhesive coating, and through the attachment surface of the cover. In the embodiment illustrated in FIG. 5B, the cover or label 12 includes a printable coating 17 which can be formed from coatings often applied to ink-jet papers to enhance the printing process, e.g., porous media and swellable media coatings. In this aspect of the invention, the display surface 12*b* of the cover includes the upper surface 17*b* of the printable coating.

It will be appreciated that in each of these embodiments, the relief notch 34, 34' is formed from the bottom, attachment surface 12*a* of the cover or label and terminates below the top, display surface 12*b* of the cover or label. In this manner, the relief notch serves to limit or resist the formation of cantilever forces in the cover resulting from bending or wrapping of the cover, but also does not interfere with or mar the display surface of the cover. This feature is advantageous in those embodiments where the display surface of the cover includes an image (not shown) disposed thereon, as the relief notch does not distract from or compromise the image.

Figure 5B:
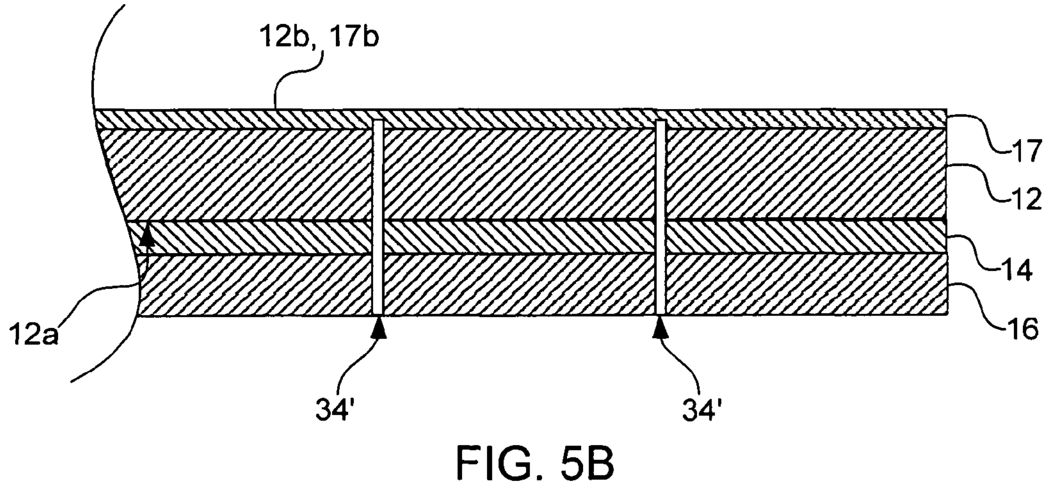
FIG. 5B is a sectional edge view of another embodiment of the cover or label of FIG. 4 taken along section 5-5 of FIG. 4, with a printable coating applied to the cover or label.

This feature is also advantageous in those embodiments in which the cover or label 12 comprises a printable label, as shown by example in FIG. 5B. In these embodiments, the cover or label is generally provided to a consumer as a blank cover and the consumer feeds the cover through his or her printer to apply an image thereto. Once printed, the cover or label can be manually applied by a consumer to an article 20. It is well known that printing processes such as ink-jet printing are significantly compromised by the presence of irregularities on or in the print surface of the paper or sheet being printed. If the relief notch 34, 34' were formed through the display surface of the label, a printed image applied to the display surface could be comprised by the presence of the notch. However, by terminating the notch below the display surface, the entire label, including tabs 28*a*, 28*b*, can be printed with equal clarity and quality finish.

Figure 3:
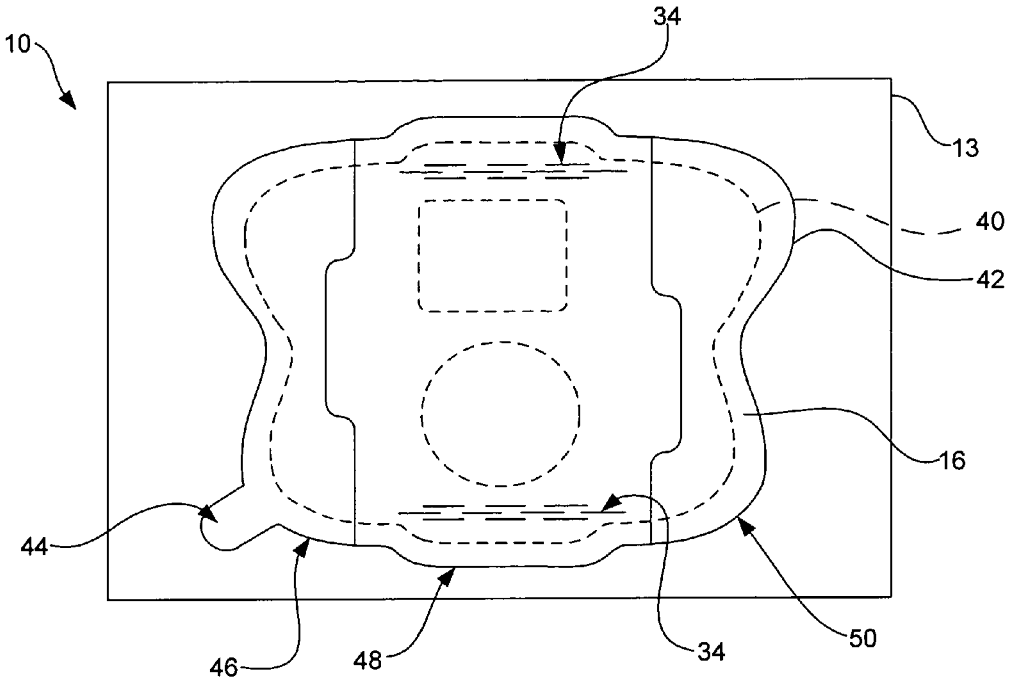
FIG. 3 is a bottom view of the protective device of FIG. 1.
Figure 4:
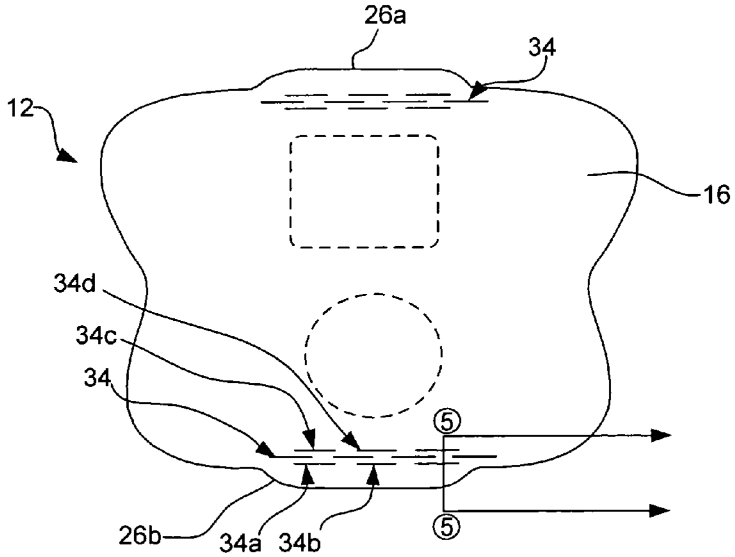
FIG. 4 is a bottom view of a cover or label of the protective device of FIG. 1 having a removable backing attached thereto that is sized and shaped to substantially match that of the cover.

Turning now to FIG. 3, in another aspect of the present invention, the cover 12 can include an outer perimeter 40 and the removable backing 16 can also include an outer perimeter 42. In this aspect of the invention, the outer perimeter of the removable backing can extend past the outer perimeter of the cover. In this manner, a user can grasp tab 44 of the removable backing and separate the removable backing and the cover as a unit from sheet 13. Once removed, each of backing sections 46, 48 and 50 can be removed from the label and the label can be applied to the article. By selectively removing one or more removable sections prior to attaching the cover to the article, the consumer can grasp one or more removable sections remaining on the cover prior to orienting the cover over the article. For example, backing section 48 can be removed from the cover and the section of adhesive thereby exposed can be oriented on or over the article by the user while the user grasps backing sections 46 and 50. In this manner, the consumer can avoid contacting the adhesive coating (not shown in FIG. 3) while orienting and attaching the cover to the article.

Figure 6:
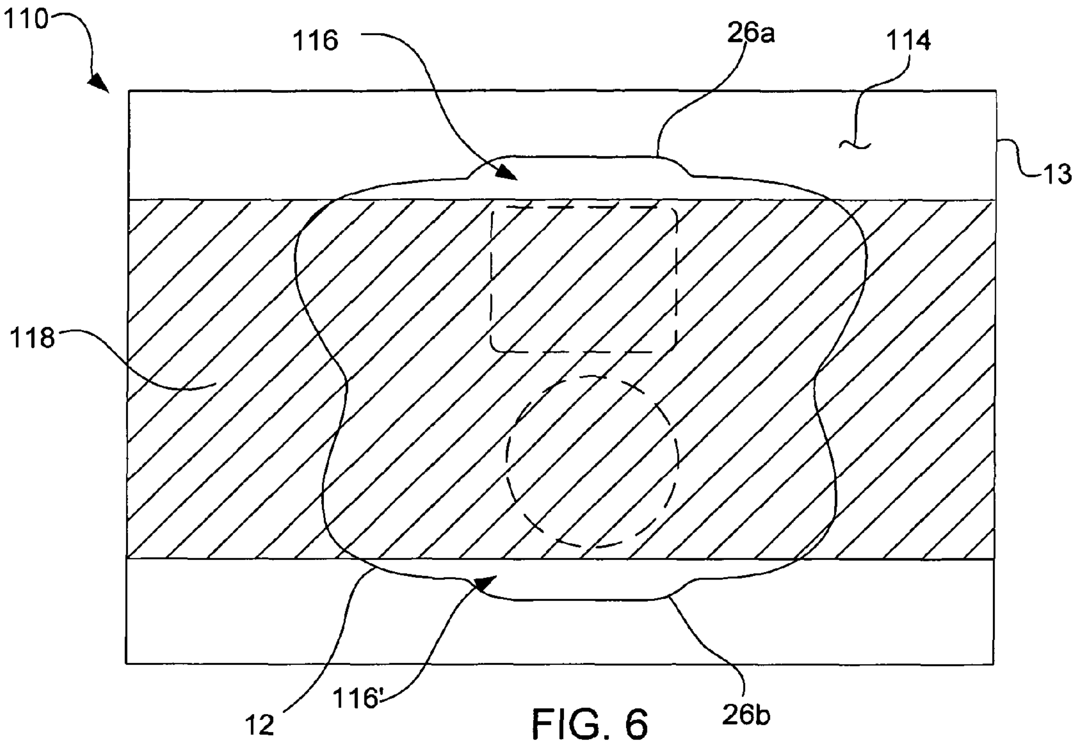
FIG. 6 is a bottom view of a protective device in accordance with another embodiment of the invention.
Figure 7:
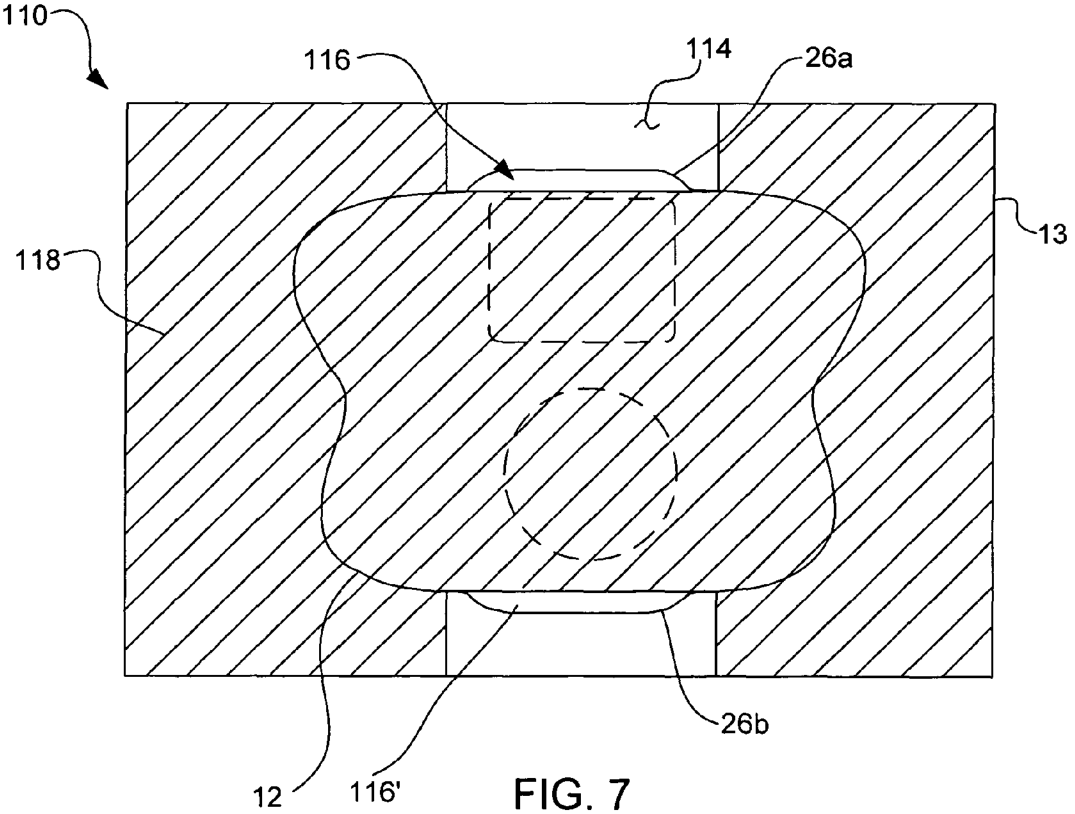
FIG. 7 is a bottom view of a protective device in accordance with another embodiment of the invention.

FIGS. 6 and 7 illustrate alternate embodiments of the invention with sheet 13 shown from a bottom view. In this aspect of the invention, the protective and/or decorative device 110 includes cover or label 12 which can include an attachment surface (12*a* in FIG. 5A) and a display surface (12*b* in FIG. 5A) opposing the attachment surface. An adhesive coating 114 can be applied to the attachment surface of the sheet or cover to facilitate adhesion of the cover to an article (shown schematically at 20 in FIG. 2), once the cover is separated from the remainder portion of sheet 13. In this aspect of the invention, the adhesive coating can include at least a first section 116 of adhesive having a first adhesive strength and a second section 118 of adhesive having a second adhesive strength, with the first adhesive strength differing from the second adhesive strength. While not shown in FIGS. 6 and 7, a removable backing can be releasably attached to the adhesive coating, as in the embodiments described above.

In the embodiment shown, the first section 116 of adhesive is formed adjacent to a side edge of the cover, in this case over and adjacent to tabs 26*a*, 26*b*. In this aspect, the first adhesive section includes a first adhesive strength that is stronger than the second adhesive strength of the second section 118 of adhesive. In this manner, the adhesive coating on the tabs is stronger than the adhesive on the remainder of the cover or label to aid in firmly affixing the tabs about sides of the article without peeling or lifting of the tabs. The weaker, second adhesive section on the remainder of the label is sufficiently strong to attach the cover or label to the face of the article without forming an overly strong bond, while the first, stronger adhesive section over the tabs is sufficiently strong to bond the tabs in spite of any cantilever forces that may be present in or near the tabs. In this aspect of the invention, the first section 116 of adhesive includes at least two noncontiguous regions, 116, 116', each of which is adjacent to a side of the cover near a respective tab.

The sections of adhesives having varying adhesive strength can be formed on the cover or label 12 in a variety of manners. In one aspect, the second section 118 of the adhesive can be treated with an adhesive modifier to modify the second adhesive strength of the second section of the adhesive coating relative to the first adhesive strength of the first section 116 of the adhesive coating. While not required, in this aspect of the invention the adhesive modifier includes an adhesive dampener or deadener which serves to weaken the adhesive strength of the second adhesive section.

The adhesive modifier can be combined with or added to the adhesive in a number of manners. In one aspect, the adhesive modifier is applied over the second section 118 of adhesive after the second section has been applied to the sheet 13 (and to cover or label 12). Shown schematically in FIGS. 6 and 7, in one aspect of the invention, the adhesive modifier can be applied over the second section of adhesive in a banded pattern. In this manner, the amount of adhesive modifier can be varied by widening or narrowing the bands of modifier, or by widening or narrowing the spacing between the bands of modifier. To aid in avoiding application of the adhesive modifier to the first section of adhesive, the first section can be masked or otherwise shielded from the adhesive modifier, as would occur to one skilled in the art.

In another aspect of the invention, the adhesive modifier can be mixed with adhesive prior to application of the second section 118 of adhesive. In this manner, the second section of adhesive need not be treated after application of the second section to the cover 12.

Rather than utilizing an adhesive dampener or deadener to alter one section of the adhesive coating 114, the adhesive modifier can include an adhesive strength enhancer to alter one section of the coating relative to another. In this manner, rather than weakening the adhesive of one section of adhesive relative to another, one section of adhesive can be modified to strengthen that particular section relative to another.

To simplify the discussion herein, the terms "first" and "second" sections of adhesive have been used to identify distinct sections of adhesive having variable adhesive strengths. It is to be understood, however, that first and second are used merely as relative terms and that the sections of adhesive may vary as to strength, order of application, position on the cover, etc., without regard to sequence of application or treatment.

In addition to the structural elements provided by the present invention and discussed above, the present invention also provides a method for preparing a protective device for covering and protecting an article, including the step of forming at least one relief notch in a cover, the relief notch extending through an attachment surface of the cover and terminating at a location beneath a display surface of the cover. The method can include the further step of applying an adhesive coating to the attachment surface of the cover to enable adhesion of the cover to an article. The method can include the further step of releasably applying a removable backing to the adhesive coating to shield the adhesive coating until the cover is to be attached to the article.

The method can include the further steps of forming the relief notch firstly through the removable backing, secondly through the adhesive coating, and thirdly through the attachment surface of the cover.

In accordance with another aspect of the invention, a method preparing a protective device for covering and protecting at least one article is provided, including the step of applying an adhesive coating to an attachment surface of a cover to enable adhesion of the cover to an article. The adhesive coating can include at least a first section of adhesive having a first degree of adhesive strength and a second section of adhesive having a second degree of adhesive strength, the first adhesive strength can differ from the second adhesive strength. The method can include the further step of releasably applying a removable backing to the adhesive coating to shield the adhesive coating until the cover is to be attached to the article.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A protective device for attaching to and protecting at least one article, comprising:

a cover, having:

i) an attachment surface; and ii) a display surface opposing the attachment surface;

an adhesive coating applied to the attachment surface of the cover to facilitate adhesion of the cover to an article;

a removable backing, releasably attached to the adhesive coating; and at least one relief notch formed in the cover through the attachment surface of the cover and terminating beneath the display surface of the cover, wherein the cover is formed of a fibrous material and wherein the at least one relief notch formed in the cover at least partially severs a fiber of the cover.

2. The device of claim 1, wherein the at least one relief notch extends through the adhesive coating and through the attachment surface of the cover.

3. The device of claim 2, wherein the at least one relief notch extends through the removable backing, through the adhesive coating, and through the attachment surface of the cover.

4. The device of claim 1, wherein the cover comprises a printable label.

5. The device of claim 1, wherein the cover and the removable backing each include an outer perimeter, and wherein the outer perimeter of the removable backing extends past the outer perimeter of the cover.

6. The device of claim 1, wherein the cover includes at least one tab configured to be attached to the article and wherein the at least one relief notch is disposed adjacent to the at least one tab.

7. The device of claim 1, wherein the display surface of the cover includes an image disposed thereon.

8. The device of claim 1, wherein the at least one relief notch includes a pair of individual, collinear relief notches formed in the cover.

9. The device of claim 8, further comprising a second pair of individual, collinear relief notches formed in the cover and oriented parallel to the pair of individual, collinear relief notches.

10. The device of claim 1, wherein the article is selected from the group consisting of a PDA, a hand-held musical player, and a cell phone, and wherein the cover is sized to extend across a top of the article and around at least a portion of a side of the article.

11. The device of claim 10, wherein the article comprises the hand-held musical player and wherein the cover is sized to extend across a top of the player and around at least a portion of a side and a bottom of the player.

12. The device of claim 1, further comprising at least one aperture formed in a central portion of the cover, the aperture being configured to expose operable features of the article through the cover.

13. The device of claim 1, wherein the adhesive coating includes at least a first section of adhesive having a first adhesive strength and a second section of adhesive having a second adhesive strength, the first adhesive strength differing from the second adhesive strength.

14. A protective device for attaching to and protecting at least one article, comprising:

a cover, having:

i) an attachment surface; and ii) a display surface opposing the attachment surface;

an adhesive coating applied to the attachment surface of the cover to facilitate adhesion of the cover to the article;

the adhesive coating including at least a first section of adhesive having a first adhesive strength and a second section of adhesive having a second adhesive strength, the first adhesive strength differing from the second adhesive strength; and a removable backing, releasably attached to the adhesive coating, the outer cover and the removable backing each including an outer perimeter, and wherein the outer perimeter of the removable backing extends past the outer perimeter of the cover.

15. The device of claim 14, wherein the first section of adhesive is adjacent to a side edge of the cover and wherein the first adhesive strength is stronger than the second adhesive strength.

16. The device of claim 14, wherein the first section of adhesive includes at least two noncontiguous regions each adjacent to a side of the cover, and wherein the first adhesive strength is stronger than the second adhesive strength.

17. The device of claim 14 wherein the second section of the adhesive is treated with an adhesive modifier to modify the second adhesive strength of the second section of the adhesive coating relative to the first adhesive strength of the first section of the adhesive coating.

18. The device of claim 17, wherein the adhesive modifier is applied over the second section of adhesive.

19. The device of claim 17, wherein the adhesive modifier is applied over the second section of adhesive in a banded pattern.

20. The device of claim 17, wherein the adhesive modifier is mixed with adhesive prior to application of the second section of adhesive.

21. The device of claim 17, wherein the adhesive modifier comprises an adhesive strength enhancer.

22. The device of claim 17, wherein the adhesive modifier comprises an adhesive strength dampener.

23. The device of claim 14, wherein the display surface of the cover includes an image disposed thereon.

24. The device of claim 14, wherein the cover comprises a printable label.

25. The device of claim 14, further comprising at least one relief notch formed in the cover through the attachment surface of the cover and terminating beneath the display surface of the cover.

* * * * *

UNITED STATES PATENT AND TRADEMARK OFFICE

CERTIFICATE OF CORRECTION

PATENT NO. : 8,236,400 B2
APPLICATION NO. : 10/943683
DATED : August 7, 2012
INVENTOR(S) : Larry E. Trigg et al.

It is certified that error appears in the above-identified patent and that said Letters Patent is hereby corrected as shown below:

In column 10, line 10, in Claim 14, before “cover” delete “outer”.

Signed and Sealed this
Twenty-sixth Day of February, 2013

Teresa Stanek Rea
*Acting Director of the United States Patent and Trademark Office*